May 3, 1938.  D. H. HEUMAN  2,116,026
VEHICLE SPRING SUSPENSION
Filed Jan. 2, 1935
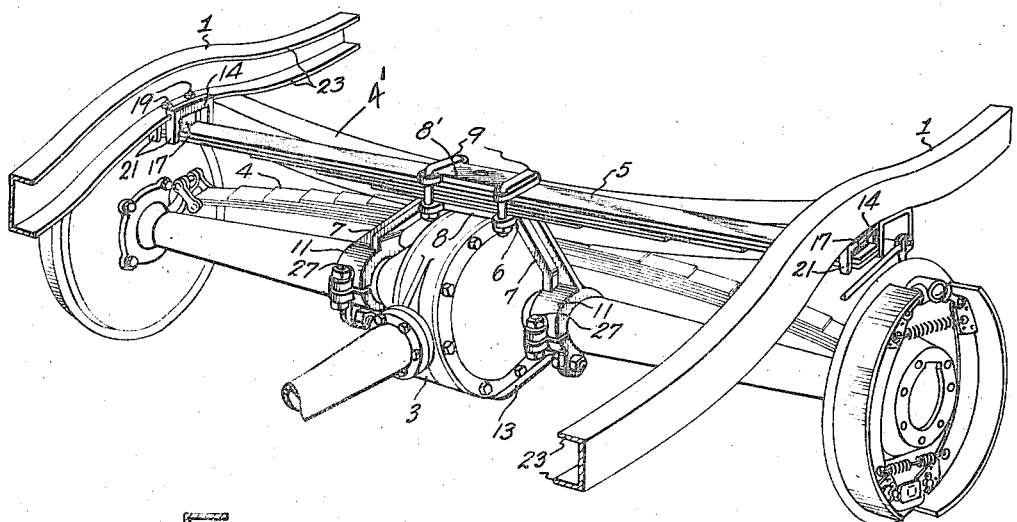
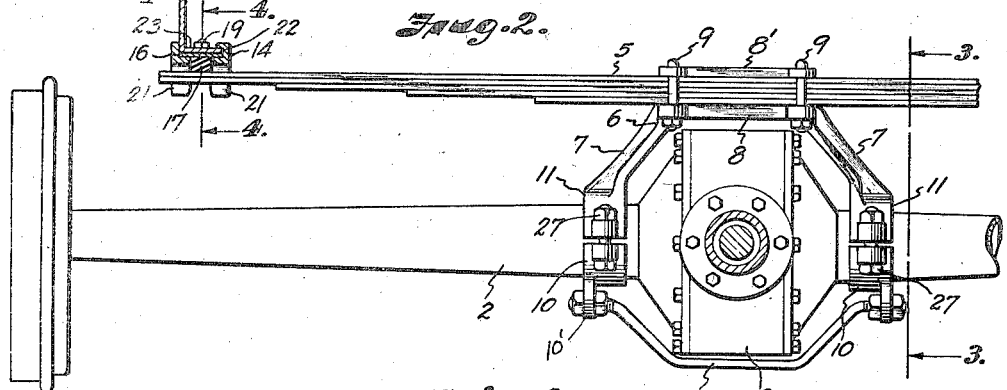
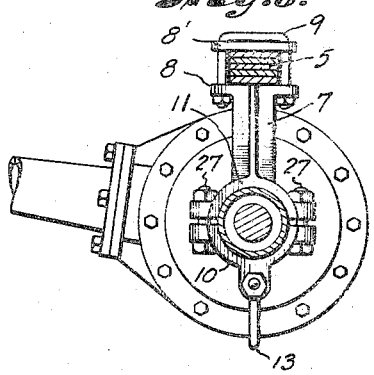
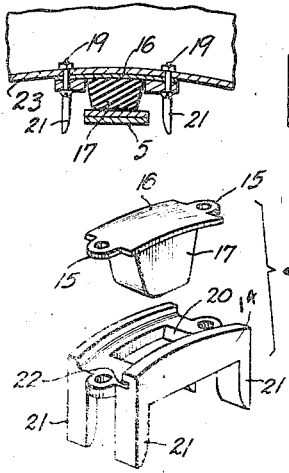
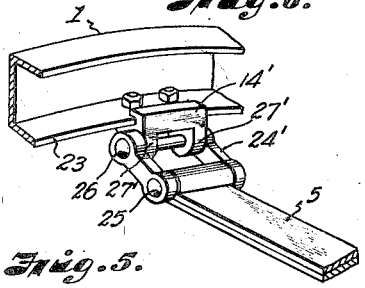
INVENTOR.
Daniel H. Heuman
By Howard S. Bryant
ATTORNEY.

Patented May 3, 1938

2,116,026

UNITED STATES PATENT OFFICE 2,116,026

VEHICLE SPRING SUSPENSION

Daniel H. Heuman, Kansas City, Mo.

Application January 2, 1935, Serial No. 37

5 Claims. (Cl. 267—36)

This invention relates to a vehicle spring suspension device, and particularly an auxiliary spring suspension device for motor vehicles in which the frame of the vehicle is supported by a transverse spring or springs. More specially it is adapted for an auxiliary spring for "Ford" automobiles.

The invention accordingly consists in the features, combinations and arrangements of parts which will be exemplified in the construction hereinafter described or claimed for carrying out the above stated object and such other objects as will hereinafter appear in the description.

Generally described the invention relates to an auxiliary spring which is adapted to be interposed between the frame of the vehicle and the axle. Means are associated with the axle whereby the spring is adapted to be secured in position and have ends projecting to engage with the side sills of the frame or clips carried thereby.

For a better understanding of the invention reference may be made to the accompanying drawing, in which Figure 1 is a perspective view of a rear axle assembly showing one embodiment of my invention;

Figure 2 is a front elevation of Figure 1 with parts broken away and partly in cross section;

Figure 3 is a cross sectional view taken on lines 3—3 of Figure 2;

Figure 4 is a detailed view taken on lines 4—4 of Figure 2;

Figure 5 is a perspective and exploded view of the buffer clip assembly which engages the end of the spring; and Figure 6 is a modified form of mounting for the ends of the spring upon the frame.

Referring specifically to the drawing, numeral 1 designates the side sills or channels of a vehicle chassis or body. These are preferably of metal construction with the edges formed into flanges 23, which give substantially a U-shaped form to the side channels 1 of the frame. The frame is supported by a spring 4, which is of conventional construction and conventionally associated with the body, and a bowed member $4^1$ interposed between spring 4 and the side channels of the body. In addition to the main supporting spring device 4 there may be advantageously interposed between the frame and the axle 2 an auxiliary spring 5 which at its intermediate portion is clamped to a bracket 6 by means of U bolts 9 and clamping plates 8, $8^1$. The plate 8 may be integral with bracket 6 or it may be separate therefrom. Plate $8^1$ is of the same general conformation, being provided with ears to receive the U bolts. The brackets 6 have oppositely and downwardly disposed arms 7, which terminate in caps 11, which are contoured to conform with the axle 2 and be engaged by cap plates 10, which are clamped in place by tie bolts 27, which engage projecting ears on the caps 11 and the cap plates 10. The caps 10 may advantageously be provided with downwardly disposed ears in order to receive a truss rod 13, which may be clamped thereto. This bracket permits the auxiliary spring to be securely mounted upon the axle in the vicinity of the differential 3, in fact the bracket is preferably mounted directly over the differential portion of the rear axle 2. The ends of the spring 5 are adapted to nest within a recess formed in the buffer members 14, the recess being defined by a series of projecting arms 21. The top portion of the buffer member 14 is recessed at 20 in order to receive the buffer 17, which is preferably of rubber material and is molded directly or otherwise attached to the base member 16. The base member 16 is provided on opposite ends with ears 15, whereby it may be clamped to the member 14 by bolts 19, which project through the ears 15 and similar ears formed on the member 14.

The buffer member is of a construction to fit over the channel 1 of the side frame by having a recessed portion 22 which receives the flange 23 on the side channels of the frame member. When the buffer member is assembled and clamped in position on the flange 23 the top ends of the springs contact with the buffer portion 17 and are slidably secured in place by the legs or arms 21 on each end of the member 14. The modification in Figure 6 shows an equivalent method of positively fastening the ends of the spring 5 to the side channels 1 of the frame member. The end of the spring is connected to the clip $14^1$ by means of shackles $24^1$ secured to the end of the spring by bolt 25 and to the member $14^1$ by the bolt 26. The member $14^1$ has lugs $27^1$ projecting therefrom which are drilled to receive the bolt 26. In this modification the end of the spring is positively fastened rather than merely having a recessed portion as in the previously described modification, in which a recess is provided to receive the end of the spring.

While I have described certain preferred embodiments in detail it will be understood that such detailed construction is for the purpose of illustration and not as a limitation of the invention. Various changes may be made in details of construction without departing from the spirit of the invention.

I claim:

1. In combination with a vehicle chassis and axle including a differential housing, a main spring support between the chassis and the axle, an auxiliary spring support for the chassis comprising an auxiliary spring extending in a direction transversely of the chassis and assisting in the support of the chassis, bracket means upon which the spring is supported intermediate its ends, said bracket means having a portion to which the spring is secured and having another portion embracing the housing and secured to the axle.

2. In combination with a vehicle axle and a chassis having longitudinal side sills, a main spring support between the chassis and the axle, said main spring support extending in a direction transversely of the chassis, and an auxiliary spring supporting device for the chassis comprising an auxiliary spring also extending transversely of the chassis and, at its outer ends, supporting the side sills, and a bracket upon which the auxiliary spring is supported intermediate its ends, said bracket having a pair of arms secured to the axle.

3. In combination, a vehicle axle including a differential housing, a chassis having longitudinal side sills, a main spring support between the chassis and the axle, said main spring support extending in a direction transversely of the chassis, and an auxiliary spring supporting device for the chassis comprising an auxiliary spring also extending transversely of the chassis and, at its outer ends, supporting the side sills, and a bracket upon which the auxiliary spring is supported intermediate its ends, said bracket having a pair of arms secured to the axle.

4. In combination, a vehicle axle including a differential housing, a chassis having longitudinal side sills, a main spring support between the chassis and the axle, said main spring support extending in a direction transversely of the chassis, and an auxiliary spring supporting device for the chassis comprising an auxiliary spring also extending transversely of the chassis and, at its outer ends, supporting the side sills, and a bracket upon which the auxiliary spring is supported intermediate its ends, said bracket having a pair of arms secured to the axle and bracing means joining the two arms and extending below the differential housing.

5. In combination with a vehicle chassis including longitudinally extending sills and an axle including a differential housing, a spring device connecting the chassis with the axle, an auxiliary spring suspension device comprising an auxiliary spring extending transversely of the vehicle and a bracket means upon which the auxiliary spring is mounted intermediate the ends of the spring, the free ends of said auxiliary spring extending to said sills and assisting in the support of the chassis, said bracket embracing the differential and being mounted upon the axle and including a pair of arms secured to the axle on opposite sides of the differential housing and a reenforcing member connecting the arms below the differential housing.

DANIEL H. HEUMAN.